(12) United States Patent
Harada

(10) Patent No.: US 12,251,966 B2
(45) Date of Patent: Mar. 18, 2025

(54) RUN-FLAT TIRE

(71) Applicant: The Yokohama Rubber Co., LTD., Tokyo (JP)

(72) Inventor: Shunya Harada, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 756 days.

(21) Appl. No.: 16/981,683

(22) PCT Filed: Feb. 15, 2019

(86) PCT No.: PCT/JP2019/005713
§ 371 (c)(1),
(2) Date: Sep. 16, 2020

(87) PCT Pub. No.: WO2019/176445
PCT Pub. Date: Sep. 19, 2019

(65) Prior Publication Data
US 2021/0031562 A1 Feb. 4, 2021

(30) Foreign Application Priority Data
Mar. 16, 2018 (JP) .................................. 2018-050172

(51) Int. Cl.
*B60C 11/00* (2006.01)
*B60C 3/04* (2006.01)
(Continued)

(52) U.S. Cl.
CPC .............. *B60C 11/005* (2013.01); *B60C 3/04* (2013.01); *B60C 17/0009* (2013.01); *B60C 2011/0033* (2013.01); *B60C 2011/0355* (2013.01)

(58) Field of Classification Search
CPC ......... B60C 11/0008; B60C 2011/0016; B60C 2011/0025; B60C 2011/0033;
(Continued)

(56) References Cited

U.S. PATENT DOCUMENTS 4,580,608 A 4/1986 Rampl
4,838,330 A * 6/1989 Takayama ........... B60C 11/0075
152/209.5

(Continued)

FOREIGN PATENT DOCUMENTS

CN 102497999 A 6/2012
CN 102529591 A 7/2012
(Continued)

OTHER PUBLICATIONS

International Search Report for International Application No. PCT/JP2019/005713 dated May 7, 2019, 4 pages, Japan.

*Primary Examiner* — Cedrick S Williams
*Assistant Examiner* — Thomas Frank Schneider
(74) *Attorney, Agent, or Firm* — Thorpe North & Western

(57) ABSTRACT

A run-flat tire includes a reinforcing rubber layer with a roughly crescent-shaped meridian cross-section disposed in sidewall portions at both sides in a tire width direction. The tread portion is provided formed of a tread rubber that includes a cap tread rubber and an undertread rubber disposed on an inner side of the cap tread rubber in a tire radial direction and having a higher hardness than the cap tread rubber. In a meridian cross-section, a gauge of the undertread rubber on a shoulder land portion on an outer side of an outermost main groove located furthest outward in the tire width direction is thicker than a gauge of the undertread rubber of a center land portion closest to a tire equatorial plane.

12 Claims, 9 Drawing Sheets

(51) Int. Cl.
*B60C 17/00* (2006.01)
*B60C 11/03* (2006.01)

(58) Field of Classification Search
CPC .............. B60C 11/0041; B60C 11/005; B60C 11/0058; B60C 11/0066; B60C 11/0075; B60C 17/0009
See application file for complete search history.

(56) References Cited

U.S. PATENT DOCUMENTS

| | | | | |
|---|---|---|---|---|
| 5,355,922 | A * | 10/1994 | Kogure | B60C 9/26 152/526 |
| 6,536,494 | B1 | 3/2003 | Baumann | |
| 2007/0102083 | A1* | 5/2007 | Hayashi | B29D 30/60 152/209.5 |
| 2007/0131329 | A1* | 6/2007 | Miyazaki | B60C 15/0045 152/564 |
| 2010/0065174 | A1* | 3/2010 | Matsunaga | B60C 11/005 152/209.14 |
| 2012/0132332 | A1* | 5/2012 | Zhao | B60C 11/00 152/209.5 |
| 2012/0285590 | A1* | 11/2012 | Sandstrom | B60C 11/0075 152/209.5 |
| 2015/0083293 | A1 | 3/2015 | Zhao et al. | |

FOREIGN PATENT DOCUMENTS

| | | | | |
|---|---|---|---|---|
| DE | 10 2009 043 991 | | 3/2011 | |
| EP | 0097787 A2 * | | 1/1984 | |
| EP | 1 013 482 | | 6/2000 | |
| EP | 2 061 833 | | 5/2009 | |
| EP | 2 452 834 A2 | | 5/2012 | |
| EP | 2 477 824 | | 7/2012 | |
| EP | 2944479 A1 * | | 11/2015 | ........... B60C 11/005 |
| JP | 2001010308 A * | | 1/2001 | ........... B60C 11/005 |
| JP | 2005239067 A * | | 9/2005 | |
| JP | 2006-082693 | | 3/2006 | |
| JP | 2012-086663 | | 5/2012 | |
| JP | 4671319 | | 4/2013 | |
| JP | 2013-233866 | | 11/2013 | |
| JP | 2015227087 A * | | 12/2015 | ........... D07B 1/062 |
| WO | WO 2008/009304 | | 1/2008 | |
| WO | WO 2011/029715 | | 3/2011 | |

* cited by examiner

RUN-FLAT TIRE

TECHNICAL FIELD

The present technology relates to a run-flat tire.

BACKGROUND ART

Pneumatic tires are mounted on rims, inflated with air, and mounted on a vehicle. Internal air pressure bears the load when the vehicle is traveling. When a pneumatic tire is punctured, air escapes and the internal air pressure becomes low. In this state, bearing a load is problematic. Specifically, a load supported by the air pressure comes to be supported by the sidewall portions, causing the sidewall portions to greatly deform. As a result, travel is impeded.

Pneumatic tires are known that are run-flat tires capable of run-flat travel in which a vehicle travels with air having escaped from the tires due to a puncture or the like (for example, Japan Patent No. 4671319). A run-flat tire is a tire provided with a reinforcing rubber layer on the inner side of the sidewall portions and of which bending rigidity of the sidewall portions has been improved. In other words, deformation of the sidewall portions of such pneumatic tires is suppressed, allowing the pneumatic tire to travel even in a state in which air inside the pneumatic tire has escaped and a large load is borne by the sidewall portions.

In a run-flat tire, the vehicle load is supported by the hard rubber on both the left and right sides. Thus, when a tire is punctured, the tread portion buckles and the ground contact area decreases. This may lead to a decrease in driving performance if traveling on a road surface with low friction. In particular, in tires designed to have a low tread rigidity like studless tires, this tendency is remarkably pronounced, and the tire spinning on icy road surfaces becomes an issue.

Additionally, for run-flat tires, even if driving performance on icy road surfaces in a low air pressure state is improved, decreasing the driving performance on icy road surfaces in a normal air pressure state is not preferable. The run-flat tire described in Japan Patent No. 4671319 above can be enhanced in terms of providing both driving performance on icy road surfaces in a low pressure state and driving performance on icy road surfaces in a normal air pressure state in a compatible manner.

SUMMARY

The present technology provides a run-flat tire that can provide both driving performance on icy road surfaces in a low pressure state and driving performance on icy road surfaces in a normal air pressure state.

A run-flat tire according to an aspect of the present technology is a run-flat tire, including a reinforcing rubber layer having a roughly crescent-shaped meridian cross-section and being disposed in sidewall portions at both sides in a tire width direction. The tread portion is provided formed of a tread rubber that includes a cap tread rubber and an undertread rubber, the undertread rubber being disposed on an inner side of the cap tread rubber in a tire radial direction and having a higher hardness than the cap tread rubber. In a meridian cross-section, a gauge of the undertread rubber on a shoulder land portion on an outer side of an outermost main groove located furthest outward in the tire width direction is thicker than a gauge of the undertread rubber of a center land portion closest to a tire equatorial plane.

Preferably, a gauge $Ga\_ce$ of the undertread rubber at the center land portion and a gauge $Ga\_sh$ of the undertread rubber at the shoulder land portion have a relationship $Ga\_ce<Ga\_sh$; and the gauge of the undertread rubber gradually decreases from the outermost main groove toward the tire equatorial plane.

Preferably, a ratio $W1/Wg$ of a width $W1$ in the tire width direction of a portion of the undertread rubber where the gauge of the undertread rubber gradually decreases from the outermost main groove toward the tire equatorial plane to a groove width $Wg$ of the outermost main groove is from 1.0 to 3.0.

Preferably, a ratio $Ga\_ce/GD$ of the gauge $Ga\_ce$ of the undertread rubber at the center land portion to a groove depth $GD$ of the outermost main groove is from 0.2 to 0.4; and a ratio $Ga\_sh/GD$ of the gauge $Ga\_sh$ of the undertread rubber at the shoulder land portion to the groove depth $GD$ of the outermost main groove is from 0.4 to 0.7.

Preferably, a gauge $H$ of the undertread rubber on the tire equatorial plane side of the outermost main groove is larger than a gauge $Ga\_ce$ and smaller than or equal to a gauge $Ga\_sh$; and a ratio $H/GD$ of the gauge $H$ to the groove depth $GD$ of the outermost main groove is from 0.3 to 0.7.

Preferably, the undertread rubber includes an undertread center rubber of the center land portion, and an undertread shoulder rubber disposed on an outer side of the undertread center rubber in the tire width direction; and a hardness of the undertread shoulder rubber is higher than a hardness of the undertread center rubber.

Preferably, in a meridian cross-section, a gauge of the undertread shoulder rubber gradually decreases from the outermost main groove toward the tire equatorial plane.

Preferably, in a meridian cross-section, a boundary surface between the undertread center rubber and the undertread shoulder rubber is inclined with respect to the tire width direction.

Preferably, a ratio $D1/D2$ of a distance $D1$ in the tire width direction from an outer end of the undertread rubber in the tire width direction to an outermost end portion of the reinforcing rubber layer in the tire radial direction to a distance $D2$ in the tire width direction from an outer edge of the outermost main groove to an outer end of the undertread rubber in the tire width direction is from 0.3 to 0.7.

A run-flat tire according to another aspect of the present technology is a run-flat tire, including a reinforcing rubber layer having a roughly crescent-shaped meridian cross-section and being disposed in sidewall portions at both sides in a tire width direction. A tread portion is provided formed of a tread rubber that comprises a cap tread rubber and an undertread rubber, the undertread rubber being disposed on an inner side of the cap tread rubber in a tire radial direction and having a higher hardness than the cap tread rubber. The undertread rubber includes an undertread center rubber of a center land portion, and an undertread shoulder rubber disposed on an outer side of the undertread center rubber in the tire width direction. A hardness of the undertread shoulder rubber is higher than a hardness of the undertread center rubber. A gauge of the undertread shoulder rubber gradually decreases from an outermost main groove located furthest outward in the tire width direction toward a tire equatorial plane. A gauge of the undertread center rubber gradually increases from the outermost main groove toward the tire equatorial plane.

According to the present technology, both driving performance on icy road surfaces in a low air pressure state and driving performance on icy road surfaces in a normal air pressure state can be provided in a compatible manner.

DETAILED DESCRIPTION

Embodiments of the present technology are described in detail below with reference to the drawings. In the embodiments described below, identical or substantially similar components to those of other embodiments have the same reference signs, and descriptions of those components are either simplified or omitted. The present technology is not limited by the embodiment. Constituents of the embodiments include elements that are essentially identical or that can be substituted or easily conceived by one skilled in the art. Note that it is possible to combine the configurations described below as desired. Moreover, various omissions, substitutions, and changes to the configurations can be carried out within the scope of the present technology.

Figure 1:
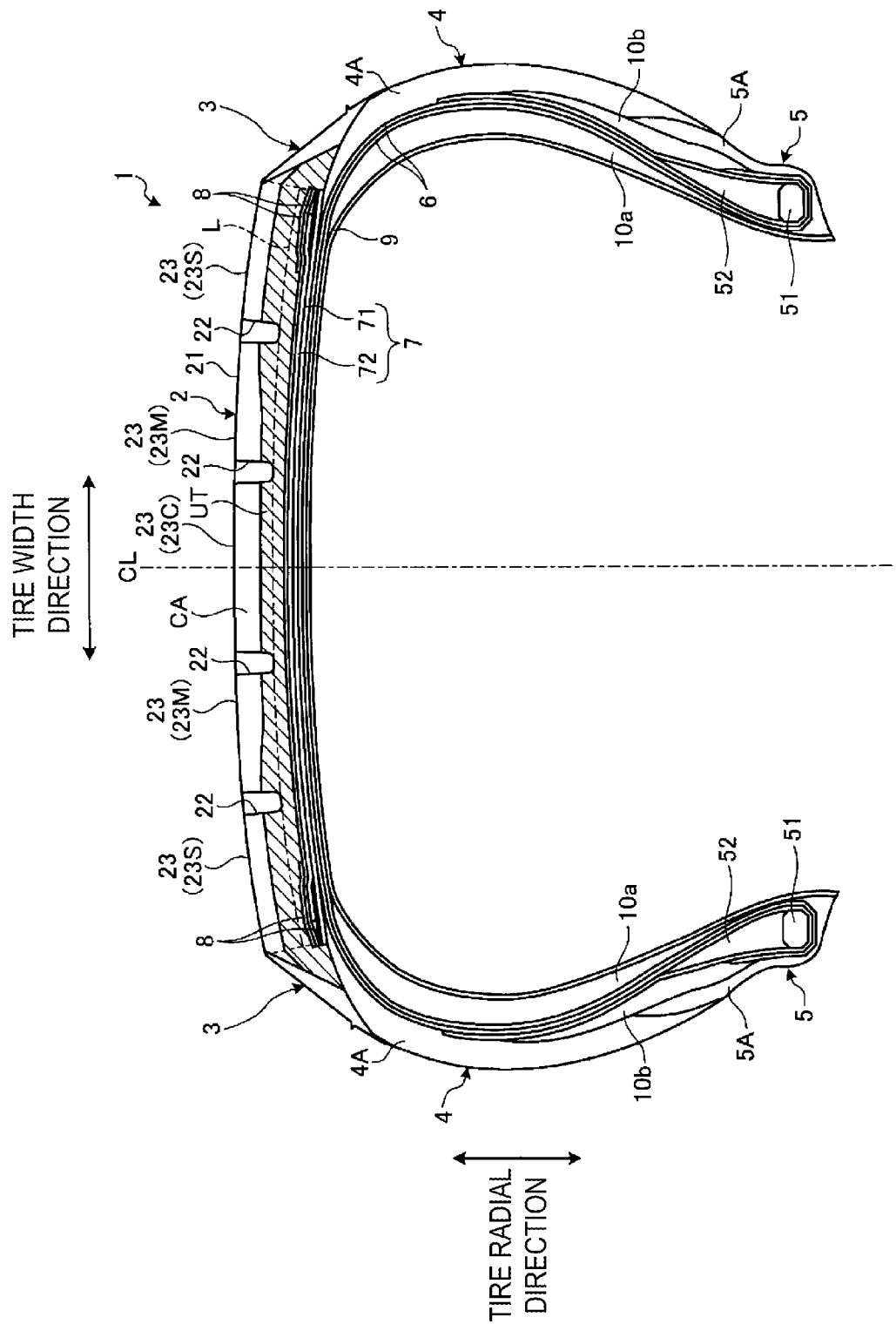
FIG. 1 is a meridian cross-sectional view of a run-flat tire according to the present embodiment.

FIG. 1 is a meridian cross-sectional view of a run-flat tire according to the present embodiment. FIGS. 2 to 5 are enlarged views illustrating a portion of the meridian cross-section of the run-flat tire of FIG. 1. In FIGS. 2 to 5, one side of an equatorial plane CL in the tire width direction is illustrated in a meridian cross-section.

Herein, "tire radial direction" refers to a direction orthogonal to a rotation axis (not illustrated in the drawings) of a run-flat tire 1. "Inner side in the tire radial direction" refers to the side toward the rotation axis in the tire radial direction. "Outer side in the tire radial direction" refers to the side away from the axis of rotation in the tire radial direction. "Tire circumferential direction" refers to the circumferential direction with the rotation axis as the center axis. Additionally, "tire width direction" refers to a direction parallel with the rotation axis P. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane orthogonal to the rotation axis of the run-flat tire 1 that passes through the center of the tire width of the run-flat tire 1. "Tire width" is the width in the tire width direction between components located on outer sides in the tire width direction, or in other words, the distance between the components that are the most distant from the tire equatorial plane CL in the tire width direction. "Tire equator line" refers to the line in the tire circumferential direction of the pneumatic tire 1 that lies on the tire equatorial plane CL. Note that in the present embodiment, the tire equator line and the tire equatorial plane are denoted by the same reference sign CL.

As illustrated in FIG. 1, the run-flat tire 1 (also referred to simply as tire 1 below) of the present embodiment includes a tread portion 2, shoulder portions 3 on opposite sides of the tread portion 2, and sidewall portions 4 and bead portions 5 continuing on from the shoulder portions 3 in that order. The tire 1 also includes a carcass layer 6, a belt layer 7, a belt reinforcing layer 8, an innerliner layer 9, and reinforcing rubber layers 10a and 10b.

The tread portion 2 is made of a tread rubber and is exposed on the outermost side of the tire 1 in the tire radial direction, with the surface thereof constituting the contour of the tire 1. A tread surface 21 is formed on an outer circumferential surface of the tread portion 2, in other words, on a road contact surface that comes into contact with a road surface when running. The tread surface 21 is provided with a plurality (four in the present embodiment) of main grooves 22 that extend in the tire circumferential direction parallel with the tire equator line CL. Moreover, a plurality of rib-like land portions 23 that extend in the tire circumferential direction are formed in the tread surface 21 by the plurality of main grooves 22. The plurality of land portions 23 include the land portion 23 referred to as a center land portion 23C located closest to the tire equator line CL. Also, the plurality of land portions 23 include the land portion 23 referred to as a shoulder land portion 23S located on an outer side of the main groove 22 (also referred to as the outermost main groove) located furthest outward in the tire width direction. The plurality of land portions 23 also include the land portion 23 referred to as a middle land portion 23M located between the center land portion 23C and the shoulder land portion 23S.

Each land portion 23 may include a plurality of blocks. Furthermore, the plurality of blocks may each include a plurality of sipes extending roughly in the width direction. The tread portion 2 can function as the tread portion of a studless tire as long as it includes a plurality of blocks and the plurality of blocks each include a plurality of sipes extending roughly in the width direction.

The main grooves 22 may extend in the tire circumferential direction in a bending or curving manner. "Main groove" refers to a groove on which a wear indicator must be provided as specified by JATMA (The Japan Automobile Tyre Manufacturers Association, Inc.) and typically has a groove width of 3.0 mm or greater and a groove depth of 6.5 mm or greater. "Lug groove" refers to a lateral groove extending in a tire width direction and typically having a groove width of 1.0 mm or greater and a groove depth of 3.0 mm or greater. Here, the outermost main groove 22 has a groove depth of from 8.0 mm to 11.0 mm.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, in a cross-sectional view normal to the groove length direction. Additionally, in a configuration in which the grooves extend in a zigzag-like or wave-like manner in the tire circumferential direction, the groove width is measured with reference to the center line of the amplitude of the groove walls. The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

Additionally, lug grooves that extend in a direction that intersects the tire circumferential direction may be provided in the land portions 23 of the tread portion 2. Both ends of the lug grooves may meet the main grooves 22, forming the land portion 23 into a plurality of block-like land portions divided in the tire circumferential direction. Note that the lug grooves may extend inclined with respect to the tire width direction in a bending or curving manner.

The shoulder portions 3 are portions of the tread portion 2 located on both outer sides in the tire width direction. In other words, the shoulder portions 3 are made of the tread rubber. Additionally, the sidewall portions 4 are exposed on the outermost sides of the tire 1 in the tire width direction. The sidewall portions 4 are each made of side rubber 4A. The bead portions 5 each include a bead core 51 and a bead filler 52. The bead core 51 is formed by winding a bead wire, which is a steel wire, into an annular shape. The bead filler 52 is a rubber material that is disposed in the space formed by an end portion of the carcass layer 6 in the tire width direction being folded back at the position of the bead core 51. The bead portions 5 each include a rim cushion rubber 5A that is outwardly exposed and comes into contact with the rim (not illustrated). The rim cushion rubber 5A constitutes the outer periphery of the bead portion 5. The rim cushion rubber 5A extends from the tire inner side of the bead portion 5 around the lower end portion thereof to a position (sidewall portion 4) covering the bead filler 52 on the tire outer side.

The end portions of the carcass layer 6 in the tire width direction are folded back around the pair of bead cores 51 from an inner side to an outer side in the tire width direction, and the carcass layer 6 is stretched in a toroidal shape in the tire circumferential direction to form the framework of the tire. The carcass layer 6 is made of a plurality of coating rubber-covered carcass cords (not illustrated) disposed side by side with an angle with respect to the tire circumferential direction along the tire meridian direction at an angle with respect to the tire circumferential direction. The carcass cords are made of organic fibers (e.g., polyester, rayon, nylon, and the like). The carcass layer 6 is provided with at least one layer, and in the present embodiment, two layers are provided. As illustrated in FIG. 1, the end portion of the inner layer of the two carcass layers 6 extends to the sidewall portion 4 covering all of the bead filler 52, whereas the end portion of the outer layer extends to a position at which the bead filler 52 is only partially covered.

The belt layer 7 has a multilayer structure in which at least two belts 71, 72 are layered. In the tread portion 2, the belt layer 7 is disposed on the outer side of the carcass layer 6 in the tire radial direction, i.e. on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (for example, from 20° to 30°). The cords are made of steel or organic fibers (polyester, rayon, nylon, or the like). Moreover, the belts 71, 72 overlap each other and are disposed so that the direction of the cords of the respective belts intersect each other.

The belt reinforcing layer 8 is disposed on the outer side of the belt layer 7 in the tire radial direction, i.e. on the outer circumference thereof, and covers the belt layer 7 in the tire circumferential direction. The belt reinforcing layer 8 is made of coating rubber-covered cords (not illustrated) disposed side by side in the tire width direction and substantially parallel (±5°) to the tire circumferential direction. The cords are made of steel or organic fibers (polyester, rayon, nylon, or the like). The belt reinforcing layer 8 illustrated in FIG. 1 includes one layer covering all of the belt layer 7 and one layer covering the end portions of the belt layer 7 in the tire width direction. The configuration of the belt reinforcing layer 8 is not limited to that described above. While not illustrated in the drawings, a configuration may be used in which, for example, the two layers are disposed covering all of the belt layer 7, or the two layers are disposed covering only the end portions of the belt layer 7 in the tire width direction. In addition, while not illustrated in the drawings, a configuration of the belt reinforcing layer 8 may be used in which, for example, one layer is disposed covering all of the belt layer 7, or one layer is disposed covering only the end portions of the belt layer 7 in the tire width direction. In other words, the belt reinforcing layer 8 overlaps with at least the end portion of the belt layer 7 in the tire width direction. Additionally, the belt reinforcing layer 8 is configured by winding a band-like (e.g. with a width of 10 mm) strip material in the tire circumferential direction.

The innerliner layer 9 is the tire inner surface, i.e. the inner circumferential surface of the carcass layer 6, and reaches the bead cores 51 of the pair of bead portions 5 at both end portions in the tire width direction and extends in the tire circumferential direction in a toroidal shape. The innerliner layer 9 prevents air molecules from escaping from the tire. Note that, as illustrated in FIG. 1, the innerliner layer 9 may be disposed extending on an inner side of the bead portion 5. However, the innerliner layer 9 may be disposed extending to the lower portion (inner side in the tire radial direction) of the bead core 51.

The reinforcing rubber layers 10a and 10b are disposed within the sidewall portion 4 and not exposed on an inner side or an outer side. The reinforcing rubber layer 10a is provided between the carcass layer 6 and the innerliner layer 9 corresponding to the tire inner side of the carcass layer 6, and has a roughly crescent-shaped meridian cross-section. The reinforcing rubber layer 10b is provided between the carcass layer 6 and the side rubber 4A and/or the rim cushion rubber 5A corresponding to the tire outer side of the carcass layer 6, and has a roughly crescent-shaped meridian cross-section. The reinforcing rubber layers 10a and 10b are formed of rubber material that has a strength greater than that of the rim cushion rubber 5A of the bead portions 5 or that of the side rubber 4A of the sidewall portions 4. Additionally, the reinforcing rubber layers 10a and 10b may be formed from different rubber materials. Note that the reinforcing rubber layers 10a and 10b are also referred to as run-flat liners.

The pneumatic tire 1 with such a configuration is mounted on a vehicle (not illustrated) with the bead portions 5 assembled on the rim and inflated to a predetermined air pressure. When the vehicle travels, the tread surface 21 comes into contact with the road surface while the tire 1 rotates. When the vehicle is traveling, because the tread surface 21 comes into contact with the road surface as described above, a load including the weight of the vehicle is borne by the tread surface 21. In the case of the tread surface 21 bearing such a load, the tire 1 elastically deforms in a manner governed by the nature of the load and hardness of the parts of the tire, and the air the tire is inflated with acts on the inside of the tire to expand the tire in an outward direction. This biasing force due to the air the tire is inflated with prevents excessive deformation of the tire 1, even when the tread surface 21 bears a load. Accordingly, the tire 1 can rotate while bearing a load, thus allowing the vehicle to travel.

Though the tire 1 does not readily deform due to the pressure of the air the tire is inflated with, while the vehicle is traveling, a foreign material may pierce the tread surface 21 and cause a puncture, for example, thus causing air from inside the tire 1 to escape. When air from inside the tire 1 escapes, the biasing force due to the air acting on the inside of the tire 1 to expand the tire 1 in an outward direction decreases in strength. When a load is borne by the tread surface 21 of the deflated tire 1, the tire-radial-direction load is borne by the sidewall portions 4. As a result, the sidewall portions 4 are susceptible to elastic deformation in the tire radial direction. However, these sidewall portions 4 are provided with the reinforcing rubber layers 10a and 10b. As described above, the reinforcing rubber layers 10a and 10b are formed of rubber material with a strength greater than that of the side rubber 4A of the sidewall portions 4. Accordingly, the reinforcing rubber layers 10a and 10b suppress deformation of the sidewall portions 4 in the tire radial direction when the sidewall portions 4 bear a tire-radial-direction load. As a result, the tire 1, by virtue of the reinforcing rubber layers 10a and 10b suppressing deformation of the sidewall portions 4 in the tire radial direction, enables travel of the vehicle or run-flat travel (travel with the tire 1 in a deflated state).

Note that the "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Rubber Gauge

Figure 2:
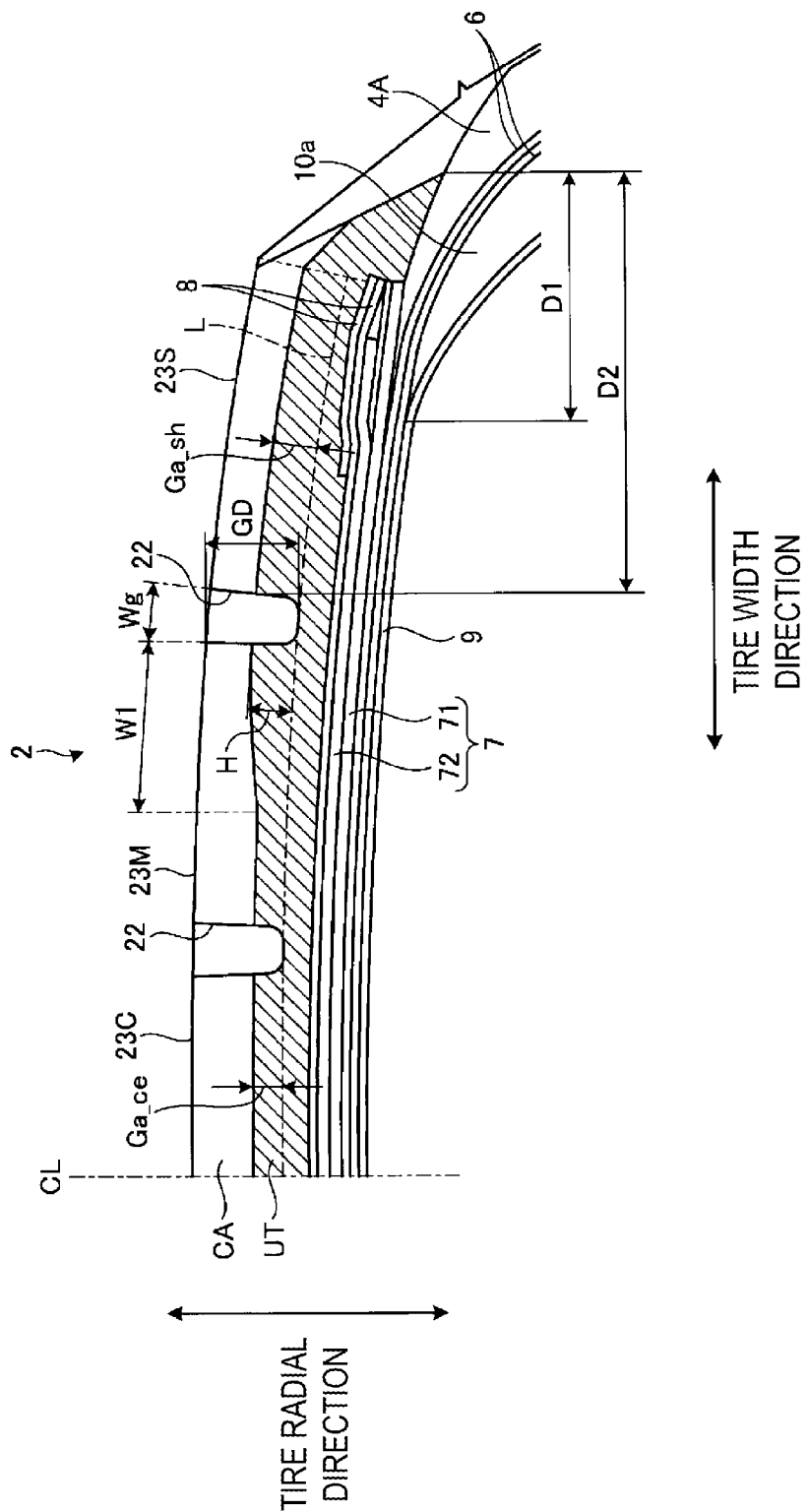
FIG. 2 is an enlarged view illustrating a portion of the meridian cross-section of the run-flat tire of FIG. 1.

As illustrated in FIGS. 1 and 2, the tread rubber that forms the tread portion 2 includes a cap tread rubber CA and an undertread rubber UT. The undertread rubber UT is disposed on an inner side of the cap tread rubber CA in the tire radial direction. The gauge of the undertread rubber UT at the shoulder land portion 23S is thicker than the gauge of the undertread rubber UT at the center land portion 23C. By increasing the gauge of the undertread rubber UT at the shoulder land portion 23S, which is prone to buckling in a low pressure state, buckling in a low pressure state can be suppressed.

Also, the undertread rubber UT has a hardness higher than the hardness of the cap tread rubber CA. The hardness of the undertread rubber UT is defined as the JIS (Japanese Industrial Standard) hardness at 20° C. and is from 55 to 85. The same applies to that described below. The hardness of the undertread rubber UT is preferably higher than the hardness of the cap tread rubber CA and/or the hardness of the reinforcing rubber layer 10a. Note that the gauge of the undertread rubber UT is determined by measuring the groove bottom of the main grooves 22 using an imaginary line L as a reference, and finding the average gauge within the land portion 23 or a block, excluding the portion of the main grooves 22.

A gauge Ga_ce of the undertread rubber UT at the center land portion 23C and a gauge Ga_sh of the undertread rubber UT at the shoulder land portion 23S, illustrated in FIG. 2, have the relationship Ga_ce<Ga_sh. Also, a gauge H of the undertread rubber UT gradually decreases from the outermost main groove 22 towards the tire equatorial plane CL. By the gauge H gradually decreasing, block rigidity can be made appropriate and performance on ice can be improved. The gauge H may gradually decrease in a straight line or may gradually decrease in a curved line as seen in a meridian cross-section. Preferably, the gauge H gradually decreases in a curved line that protrudes to the outer side in the tire radial direction.

As illustrated in FIG. 2, the ratio W1/Wg of a width W1 in the tire width direction of the portion of the undertread rubber UT where the gauge H of the undertread rubber UT gradually decreases from the outermost main groove 22 to the tire equatorial plane CL to a groove width Wg of the outermost main groove 22 is preferably from 1.0 to 3.0. When the ratio W1/Wg is less than 1.0, the block rigidity is too low, and the effect of suppressing buckling in a low pressure state is small, which is not preferable. When the ratio W1/Wg is greater than 3.0, the block rigidity is too high, and the performance on ice is difficult to ensure, which is not preferable.

As illustrated in FIG. 2, the ratio Ga_ce/GD of the gauge Ga_ce of the undertread rubber UT at the center land portion 23C to a groove depth GD of the outermost main groove 22 is preferably from 0.2 to 0.4, and the ratio Ga_sh/GD of the gauge Ga_sh of the undertread rubber UT at the shoulder land portion 23S to the groove depth GD of the outermost main groove 22 is preferably from 0.4 to 0.7. By increasing the gauge Ga_sh of the undertread rubber UT at the shoulder land portion 23S, which is prone to buckling in a low pressure state, buckling in a low pressure state can be suppressed. The gauge Ga_ce and the gauge Ga_sh of the undertread rubber UT are average values of the maximum gauges in the land portions 23C, 23S or in each block. The same applies to that described below. In the case in which many V-shaped main grooves are provided and no main grooves that extend in the tire circumferential direction are provided in the tread portion 2, the depth of a groove with a wear indicator is used as the groove depth GD. The same applies to that described below.

As illustrated in FIG. 2, the gauge H of the undertread rubber UT on the tire equatorial plane CL side of the outermost main groove 22 is larger than the gauge Ga_ce and smaller than or equal to the gauge Ga_sh. Also, the ratio H/GD of the gauge H to the groove depth GD of the outermost main groove 22 is preferably from 0.3 to 0.7. By increasing the gauge Ga_sh of the undertread rubber UT at the shoulder land portion 23S, which is prone to buckling in a low pressure state, buckling in a low pressure state can be suppressed.

Relationship with the Reinforcing Rubber Layer

The ratio D1/D2 of a distance D1 in the tire width direction from an outer end of the undertread rubber UT in the tire width direction to an outermost end portion of the reinforcing rubber layer 10a in the tire radial direction to a distance D2 in the tire width direction from an outer edge of the outermost main groove 22 to an outer end of the undertread rubber UT in the tire width direction is preferably from 0.3 to 0.7. When the ratio D1/D2 is less than 0.3, the reinforcing rubber layer 10a is not tucked under enough and load durability is decreased, which is not preferable. When the ratio D1/D2 is greater than 0.7, the reinforcing rubber layer 10a is tucked under too much and the effect of suppressing buckling in a low pressure state is small, which is not preferable.

Other Examples

Figure 3:
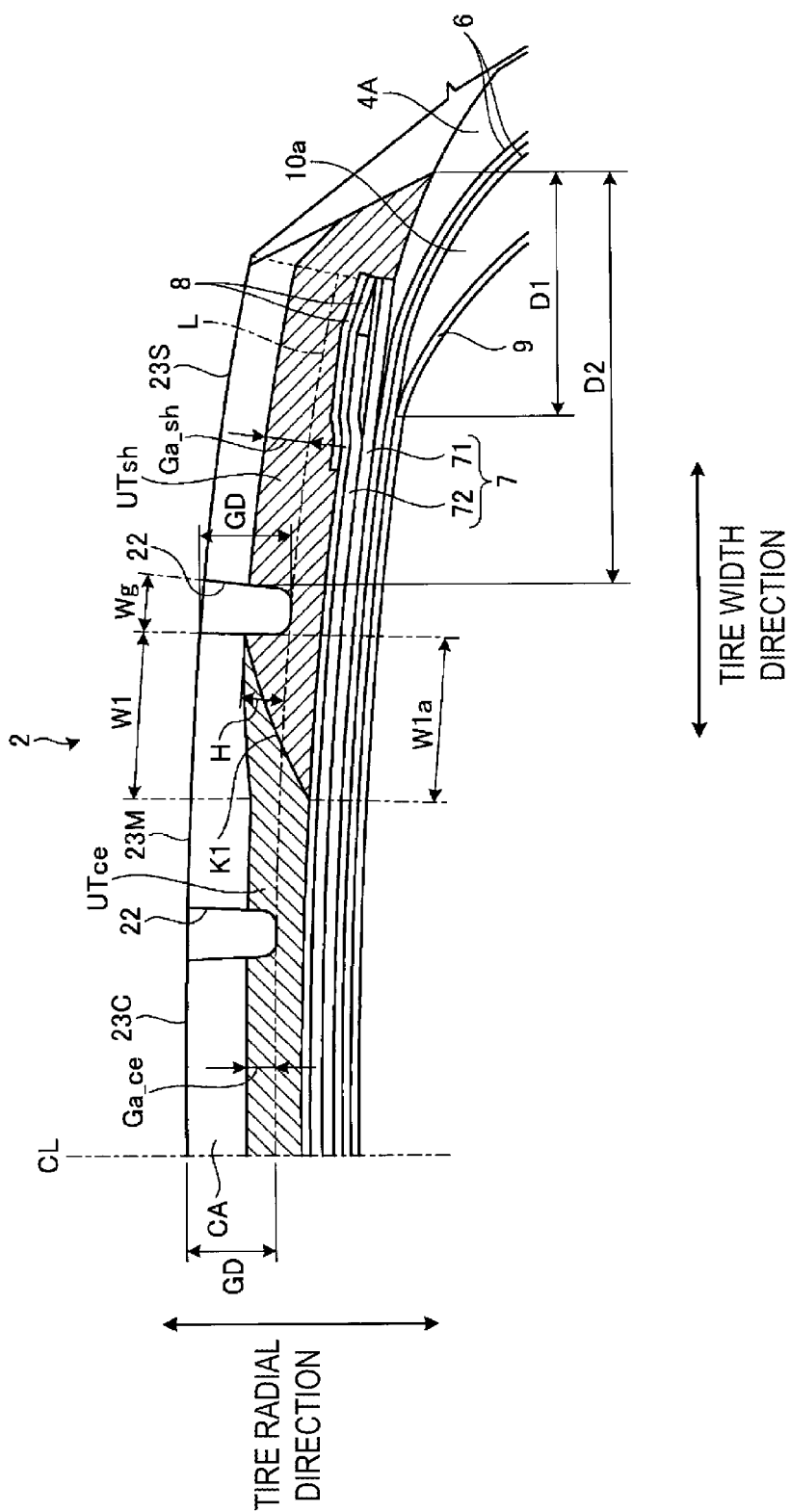
FIG. 3 is an enlarged view illustrating a portion of the meridian cross-section of the run-flat tire of FIG. 1.

FIG. 3 is a diagram illustrating a run-flat tire according to another example of the present embodiment. In this example, the undertread rubber UT is provided with a portion with a different hardness. In FIG. 3, the undertread rubber UT includes an undertread center rubber UTce of the center land portion 23C and an undertread shoulder rubber UTsh provided on the outer side of the undertread center rubber UTce in the tire width direction. Additionally, the hardness of the undertread shoulder rubber UTsh is higher than the hardness of the undertread center rubber UTce.

The hardness of the undertread center rubber UTce is defined as the JIS hardness at 20° C. and is preferably from 60 to 70. The hardness of the undertread shoulder rubber UTsh is defined as the JIS hardness at 20° C. and is preferably from 70 to 80. The undertread center rubber UTce and the undertread shoulder rubber UTsh preferably have a hardness higher than the hardness of the reinforcing rubber layer 10a. By disposing the undertread shoulder rubber UTsh with high hardness covering the outermost main groove 22, which is prone to buckling particularly in a low pressure state, buckling in a low pressure state can be suppressed.

Additionally, the hardness of the undertread center rubber UTce is lower than the hardness of the undertread shoulder rubber UTsh. In this manner, rigidity at the center land portion 23C can be decreased and performance on ice can be improved. Furthermore, because the hardness of the undertread center rubber UTce is lower than the hardness of the undertread shoulder rubber UTsh, buckling at the shoulder land portion 23S can be prevented, the ground contact area can be increased, and performance on ice can be improved.

Referring to FIG. 3, in a meridian cross-section, the gauge H of the undertread shoulder rubber UTsh gradually decreases from the outermost main groove 22 toward the tire equatorial plane CL. The ratio Ga_sh/GD of the gauge Ga_sh of the undertread shoulder rubber UTsh to the groove depth GD of the outermost main groove 22 is preferably from 0.3 to 0.7. When the ratio Ga_sh/GD is less than 0.3, the rigidity of the shoulder land portion 23S is too low, and the effect of suppressing buckling in a low pressure state is small. When the ratio Ga_sh/GD is greater than 0.7, the rigidity of the shoulder land portion 23S is too high, and the performance on ice is difficult to ensure. A boundary surface K1 between the undertread center rubber UTce and the undertread shoulder rubber UTsh may be a straight line or a curved line. Note that, preferably, the boundary surface K1 is a curved line that protrudes to the outer side in the tire radial direction.

Furthermore, in a meridian cross-section, the boundary surface K1 is inclined with respect to the tire width direction. In other words, the boundary surface K1 is continuously inclined with respect to the tire width direction. In this way, the hardness of the entire undertread rubber UT is gradually decreased, giving the land portions 23 or the blocks gradual changes in rigidity as opposed to dramatic change. This allows uneven wear to be suppressed.

The undertread center rubber UTce and the undertread shoulder rubber UTsh overlap one another at the boundary surface K1. The undertread center rubber UTce is disposed on an outer side of the boundary surface K1 in the tire radial direction and the undertread shoulder rubber UTsh is disposed on an inner side of the boundary surface K1 in the tire radial direction. The ratio W1a/W1 of a width W1a in the tire width direction of the boundary surface K1 to the width W1 in the tire width direction of the portion of the undertread rubber UT where the gauge H gradually decreases is preferably from 0.3 to 1.0.

Figure 4:
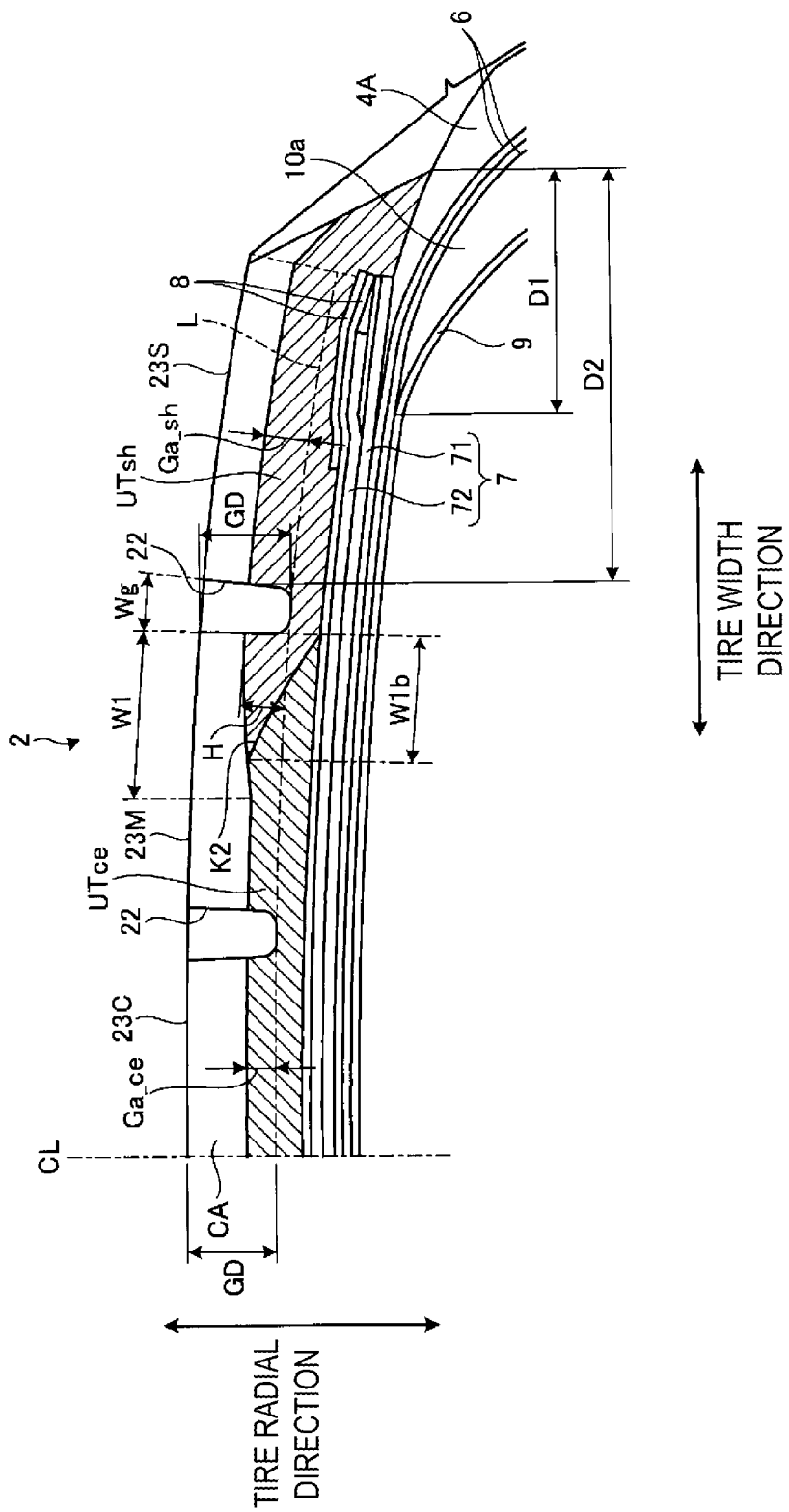
FIG. 4 is an enlarged view illustrating a portion of the meridian cross-section of the run-flat tire of FIG. 1.

Also, either the undertread center rubber UTce or the undertread shoulder rubber UTsh may be disposed on the outer side of the boundary surface K1 in the tire radial direction. FIG. 4 illustrates an example in which the undertread center rubber UTce is disposed on the inner side in the tire radial direction and the undertread shoulder rubber UTsh is disposed on the outer side in the tire radial direction. The undertread center rubber UTce and the undertread shoulder rubber UTsh overlap one another at a boundary surface K2. However, the inclination direction of the boundary surface K2 with respect to the tire width direction is different from that in FIG. 3. The ratio W1b/W1 of a width W1b in the tire width direction of the boundary surface K2 to the width W1 in the tire width direction of the portion of the undertread rubber UT where the gauge H gradually decreases is preferably from 0.3 to 0.8.

As illustrated in FIG. 3, in the case in which the undertread center rubber UTce is disposed on the outer side in the tire radial direction and the undertread shoulder rubber UTsh is disposed on the inner side in the tire radial direction, compared to the opposite configuration, the rigidity of the center land portion 23C can be decreased, which is advantageous in improving performance on ice.

Example of Groove Bottom Portion of Main Groove

Figure 5:
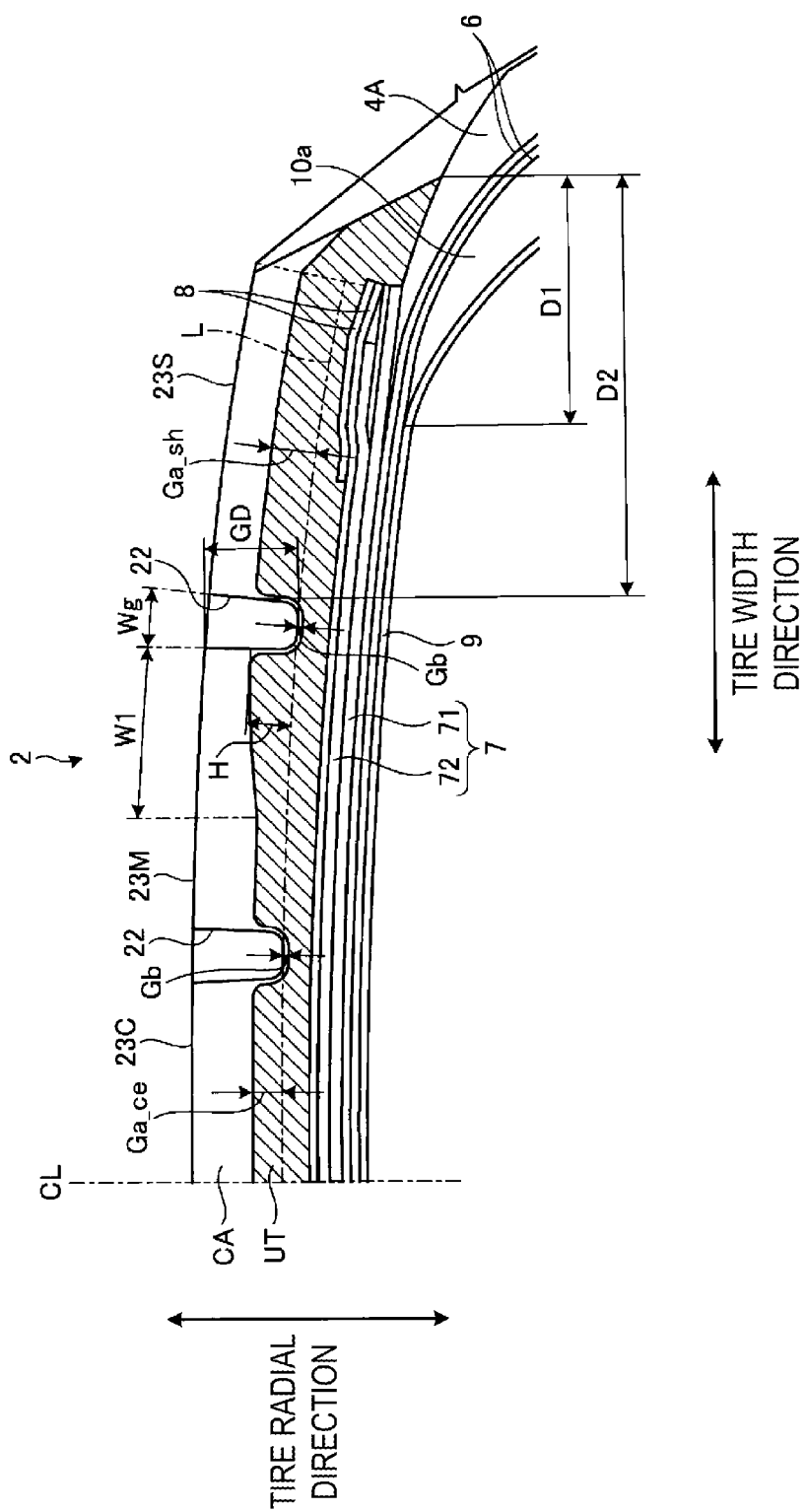
FIG. 5 is an enlarged view illustrating a portion of the meridian cross-section of the run-flat tire of FIG. 1.

FIG. 5 is a diagram illustrating in a meridian cross-section a run-flat tire according to another example of the present embodiment. During vulcanization molding, the rubber is pressed by protrusion portions of a mold (not illustrated) toward the inner side in the tire radial direction to form the main grooves 22 in the tread portion 2. At this time, the cap tread rubber CA may remain on the inner side of the groove bottom portion of the main grooves 22 in the tire radial direction. FIGS. 3 and 4 illustrate examples in which the cap tread rubber CA remains.

A thickness Gb of the cap tread rubber CA remaining on the inner side of the groove bottom portion of the main grooves 22 in the tire radial direction is small. Thus, the remaining cap tread rubber CA can be ignored, and it can be considered that the cap tread rubber CA and the undertread rubber UT is not present in the groove bottom portion of the main grooves 22. The same applies to the examples illustrated in FIGS. 3 and 4 described above.

Examples of Contact Patch Shape

Figure 6:
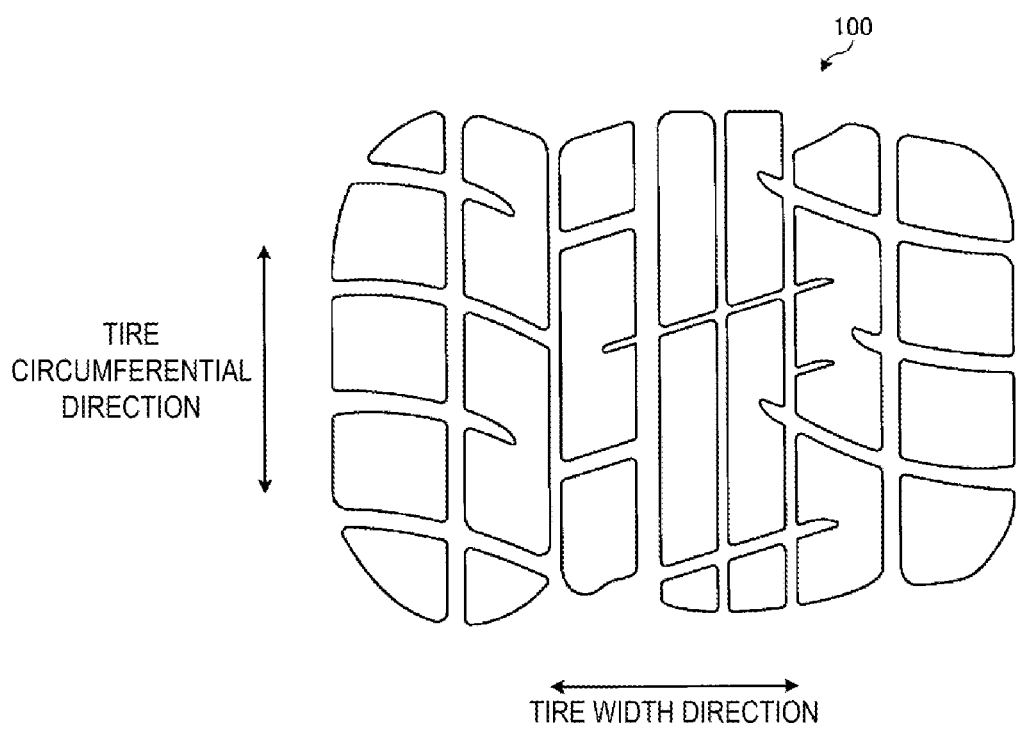
FIG. 6 is a diagram illustrating a contact patch shape of an example in which the internal pressure of the run-flat tire is 250 kPa.
Figure 7:
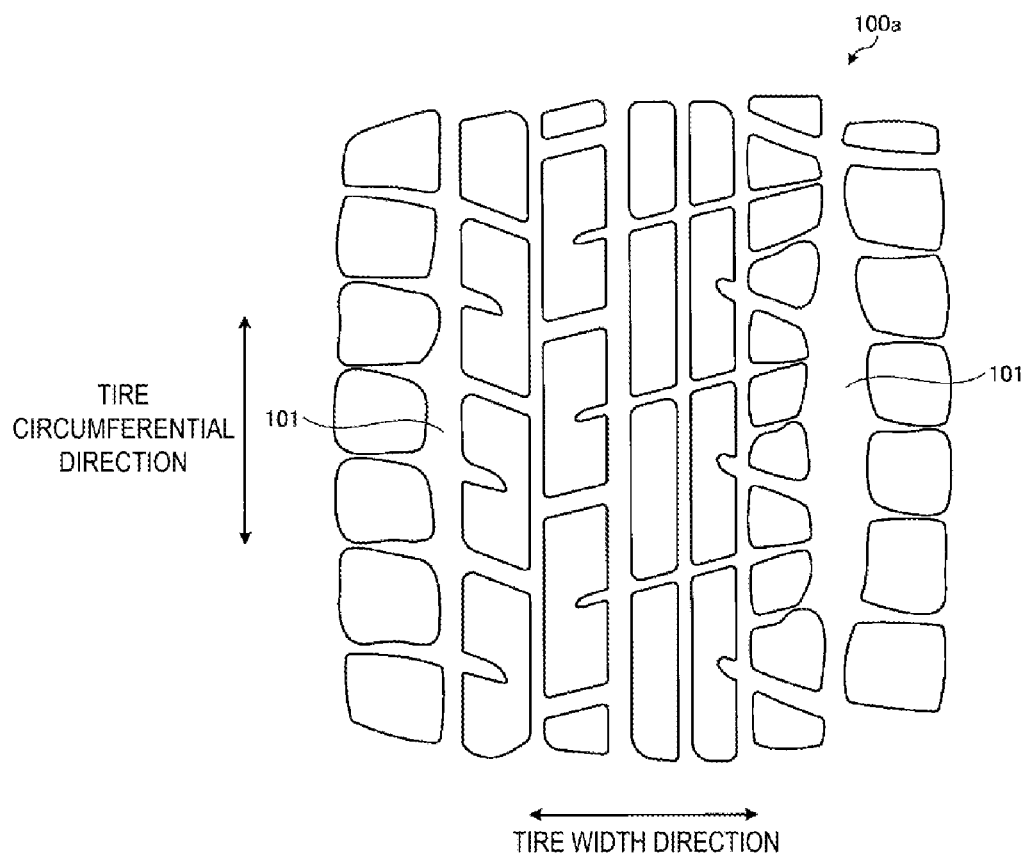
FIG. 7 is a diagram illustrating a contact patch shape of an example in which the internal pressure of the run-flat tire is 0 kPa.

Examples of contact patch shapes of run-flat tires without the undertread rubber UT described above will be described. FIG. 6 is a diagram illustrating a contact patch shape 100 of an example in which the internal pressure of the run-flat tire is 250 kPa. FIG. 7 is a diagram illustrating a contact patch shape 100a of an example in which the internal pressure of the run-flat tire is 0 kPa. In FIG. 7, when the internal pressure of the tire is 0 kPa, the ground contact pressure increases at both end portions in the tire width direction. In this case, when buckling occurs in which the tread portion is recessed to the inner side in the tire circumferential direction, the ground contact area takes the shape illustrated in FIG. 7 with less ground contact area than the shape illustrated in FIG. 6. In particular, the ground contact area of a portion 101 corresponding to the outermost main grooves 22 is greatly reduced.

In a run-flat tire provided with the undertread rubber UT as described above, buckling can be suppressed even if the internal pressure of the tire is 0 kPa, and a large decrease in ground contact area can be prevented. Thus, performance on ice in a low pressure state can be improved.

Modified Examples

Figure 8:
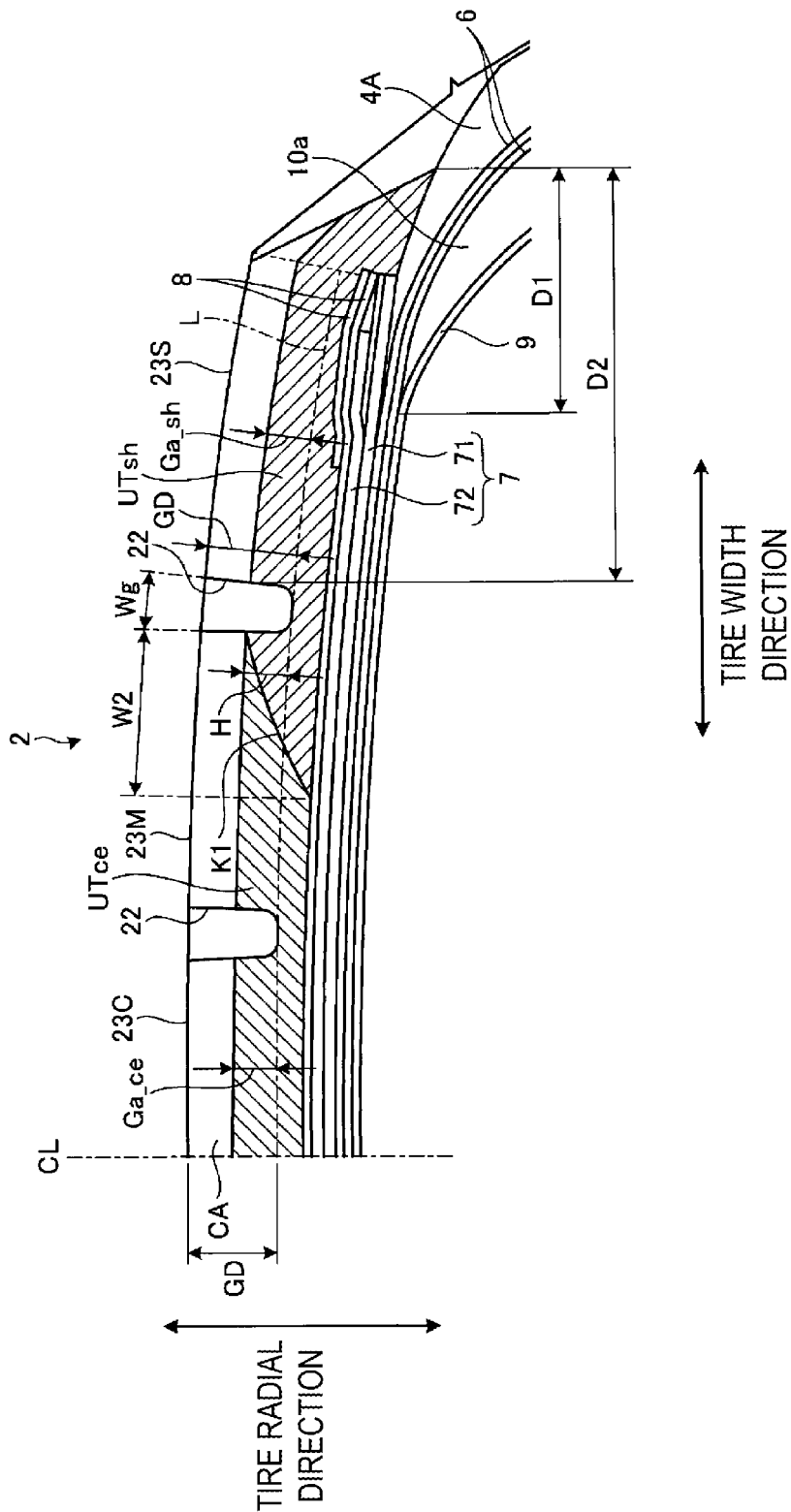
FIG. 8 is a diagram illustrating a run-flat tire according to a modified example of the present embodiment.
Figure 9:
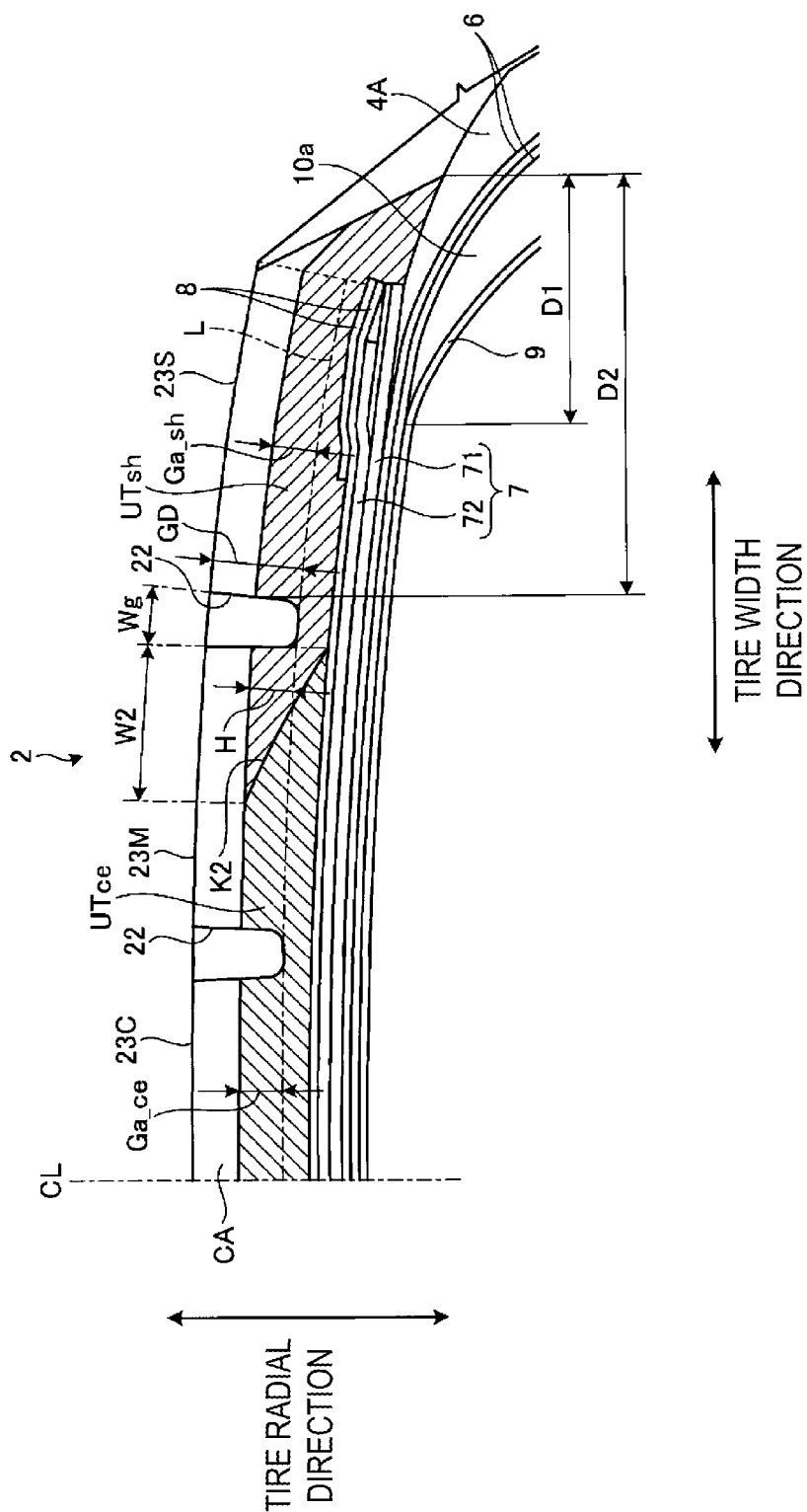
FIG. 9 is a diagram illustrating a run-flat tire according to a modified example of the present embodiment.

FIGS. 8 and 9 are diagrams illustrating a run-flat tire according to modified examples of the present embodiment. In FIG. 8, the undertread rubber UT includes an undertread center rubber UTce of the center land portion 23C and an undertread shoulder rubber UTsh provided on the outer side of the undertread center rubber UTce in the tire width direction. Additionally, the hardness of the undertread shoulder rubber UTsh is higher than the hardness of the undertread center rubber UTce. Because the hardness of the undertread shoulder rubber UTsh of the shoulder portion 3 is higher than the hardness of the undertread center rubber UTce, buckling in a low pressure state can be suppressed.

The hardness of the undertread center rubber UTce is defined as the JIS hardness at 20° C. and is preferably from 60 to 70. The hardness of the undertread shoulder rubber UTsh is defined as the JIS hardness at 20° C. and is preferably from 70 to 80. The undertread center rubber UTce and the undertread shoulder rubber UTsh preferably have a hardness higher than the hardness of the reinforcing rubber layer 10a. By disposing the undertread shoulder rubber UTsh with high hardness covering the outermost main groove 22, which is prone to buckling particularly in a low pressure state, buckling in a low pressure state can be suppressed.

Additionally, the hardness of the undertread center rubber UTce is lower than the hardness of the undertread shoulder rubber UTsh. In this manner, rigidity at the center land portion 23C can be decreased and performance on ice can be improved. Furthermore, because the hardness of the undertread center rubber UTce is lower than the hardness of the undertread shoulder rubber UTsh, buckling at the shoulder land portion 23S can be prevented, the ground contact area can be increased, and performance on ice can be improved.

Referring to FIG. 8, in a meridian cross-section, the gauge H of the undertread shoulder rubber UTsh gradually decreases from the outermost main groove 22 toward the tire equatorial plane CL. The ratio Ga_sh/GD of the gauge Ga_sh of the undertread shoulder rubber UTsh to the groove depth GD of the outermost main groove 22 is preferably from 0.3 to 0.7. When the ratio Ga_sh/GD is less than 0.3, the rigidity of the shoulder land portion 23S is too low, and the effect of suppressing buckling in a low pressure state is small. When the ratio Ga_sh/GD is greater than 0.7, the rigidity of the shoulder land portion 23S is too high, and the performance on ice is difficult to ensure. The boundary surface K1 between the undertread center rubber UTce and the undertread shoulder rubber UTsh may be a straight line or a curved line. Note that, preferably, the boundary surface K1 is a curved line that protrudes to the outer side in the tire radial direction.

Furthermore, in a meridian cross-section, the boundary surface K1 is inclined with respect to the tire width direction. In other words, the boundary surface K1 is continuously inclined with respect to the tire width direction. In this way, the hardness of the entire undertread rubber UT is gradually decreased, giving the land portions 23 or the blocks gradual changes in rigidity as opposed to dramatic change. This allows uneven wear to be suppressed.

As illustrated in FIG. 8, the ratio W2/Wg of a width W2 in the tire width direction of the boundary surface K1 where the gauge H of the undertread rubber UT gradually decreases from the outermost main groove 22 to the tire equatorial plane CL to a groove width Wg of the outermost main groove 22 is preferably from 1.0 to 3.0. When the ratio W2/Wg is less than 1.0, the block rigidity is too low, and the effect of suppressing buckling in a low pressure state is small, which is not preferable. When the ratio W2/Wg is greater than 3.0, the block rigidity is too high, and the performance on ice is difficult to ensure, which is not preferable.

Also, either the undertread center rubber UTce or the undertread shoulder rubber UTsh may be disposed on the outer side of the boundary surface K1 in the tire radial direction. FIG. 9 illustrates an example in which the undertread center rubber UTce is disposed on the inner side in the tire radial direction and the undertread shoulder rubber UTsh is disposed on the outer side in the tire radial direction. The undertread center rubber UTce and the undertread shoulder rubber UTsh overlap one another at the boundary surface K2. However, the inclination direction of the boundary surface K2 with respect to the tire width direction is different from that in FIG. 8.

The ratio W2/Wg of a width W2 in the tire width direction of the boundary surface K2 where the gauge H of the undertread rubber UT gradually decreases from the outermost main groove 22 to the tire equatorial plane CL to a groove width Wg of the outermost main groove 22 is preferably from 1.0 to 3.0. When the ratio W2/Wg is less than 1.0, the block rigidity is too low, and the effect of suppressing buckling in a low pressure state is small, which is not preferable. When the ratio W2/Wg is greater than 3.0, the block rigidity is too high, and the performance on ice is difficult to ensure, which is not preferable.

The run-flat tires 1 described with reference to FIGS. 8 and 9 are run-flat tires that include in the sidewall portions 4 at both sides in the tire width direction reinforcing rubber layers 10a with a roughly crescent-shaped meridian cross-section. The run-flat tires 1 also include the tread portion 2 including the cap tread rubber CA and the undertread rubber UT disposed on the inner side of the cap tread rubber CA in the tire radial direction, the undertread rubber UT having a higher hardness than the cap tread rubber CA. Also, the undertread rubber UT includes the undertread center rubber UTce disposed in the center land portion 23C and the undertread shoulder rubber UTsh disposed on the outer side of the undertread center rubber UTce in the tire width direction. The hardness of the undertread shoulder rubber UTsh is higher than the hardness of the undertread center rubber UTce. Furthermore, the gauge Ga_sh of the undertread shoulder rubber UTsh gradually decreases from the outermost main groove 22 toward the tire equatorial plane CL, and the gauge Ga_ce of the undertread center rubber UTce gradually increases from the outermost main groove 22 toward the tire equatorial plane CL. Because the hardness of the undertread rubber UT is set as described above, buckling at the shoulder land portion 23S can be prevented, the ground contact area can be increased, and performance on ice can be improved.

As described above, in the run-flat tire 1 of the present embodiment, the gauge of the undertread rubber UT is increased or the hardness of the undertread rubber UT is increased in the outer portion of the outermost main groove 22 located furthest outward in the tire width direction compared to the portion closest to the tire equatorial plane CL. Thus, buckling in a low pressure state at the shoulder land portion 23S can be prevented, the ground contact area can be increased, and performance on ice can be improved.

Example 1

In the examples, testing of performance on ice was performed on a plurality of types of test tires of different conditions (see Tables 1 to 3).

In the performance tests, tires having a tire size of 245/50RF19105Q were mounted on a rim and mounted on a test vehicle. Rim size is 19×7.5 J. In the performance tests, the tires were evaluated at an air pressure of 250 kPa and 0 kPa. The test vehicle is a 2000 cc four wheel drive passenger vehicle.

In the performance tests for performance on ice, the tires were given a score using sensory evaluation by a test driver after the test vehicle was driven on a test course with an icy road surface. The scores are expressed as index values and evaluated against the score of the tire of a Conventional Example used as a reference (100). For the evaluation results, larger values indicate superior performance on ice.

As indicated in Table 1, in the tire of the Conventional Example, the gauge of the undertread rubber UT of the center land portion closest to the tire equatorial plane and the gauge of the undertread rubber UT of the shoulder land portion located on the outer side of the outermost main groove located furthest outward in the tire width direction are undifferentiated, the gauge of the undertread rubber UT does not gradually decrease, and the ratio D1/D2 of the distance D1 in the tire width direction from the outer end of the undertread rubber UT in the tire width direction to the outermost end portion of the reinforcing rubber layer in the tire radial direction to the distance D2 in the tire width direction from the outer edge of the outermost main groove to the outer end of the undertread rubber UT in the tire width direction is 0.3.

As indicated in Table 1, in the tire of the Comparative Example, the gauge of the undertread rubber UT of the center land portion closest to the tire equatorial plane is larger than the gauge of the undertread rubber UT of the shoulder land portion located on an outer side of the outermost main groove located furthest outward in the tire width direction, the gauge of the undertread rubber UT does not gradually decrease, the ratio Ga_ce/GD of the gauge Ga_ce of the undertread rubber UT at the center land portion to the groove depth GD of the outermost main groove is 0.6, the ratio Ga_sh/GD of the gauge Ga_sh of the undertread rubber UT at the shoulder land portion to the groove depth GD of the outermost main groove is 0.4, the gauge H of the undertread rubber UT on the tire equatorial plane side of the outermost main groove is smaller than the gauge Ga_ce and larger than the gauge Ga_sh, the ratio H/GD of the gauge H to the groove depth GD of the outermost main groove is 0.4, the hardness of the undertread rubber UT of the center land portion and the hardness of the undertread shoulder rubber disposed on the outer side of the undertread rubber UT in the tire width direction are the same, and the ratio D1/D2 of the distance D1 in the tire width direction from the outer end of the undertread rubber UT in the tire width direction to the outermost end portion of the reinforcing rubber layer in the tire radial direction to the distance D2 in the tire width direction from the outer edge of the outermost main groove to the outer end of the undertread rubber UT in the tire width direction is 0.3.

Referring to Examples 1 to 28 in Tables 1 to 3, it can be seen that a good result is obtained in examples in which the gauge of the undertread rubber UT of the shoulder land portion located on the outer side of the outermost main groove located furthest outward in the tire width direction is larger than the gauge of the undertread rubber UT of the center land portion closest to the tire equatorial plane.

Also, referring to Examples 1 to 28 in Tables 1 to 3, it can be seen that a good result is obtained in examples in which the gauge Ga_ce of the undertread rubber UT at the center land portion and the gauge Ga_sh of the undertread rubber UT at the shoulder land portion 23S have the relationship Ga_ce<Ga_sh, the gauge of the undertread rubber UT gradually decreases from the outermost main groove towards the tire equatorial plane, and the ratio W1/Wg of the width W1 in the tire width direction of the portion of the undertread rubber UT where the gauge gradually decreases from the outermost main groove toward the tire equatorial plane to the groove width Wg of the outermost main groove is from 1.0 to 3.0, in examples in which the ratio Ga_ce/GD of the gauge Ga_ce of the undertread rubber UT at the center land portion to the groove depth GD of the outermost main groove is from 0.2 to 0.4 and the ratio Ga_sh/GD of the gauge Ga_sh of the undertread rubber UT at the shoulder land portion to the groove depth GD of the outermost main groove is from 0.4 to 0.7, and in examples in which the gauge H of the undertread rubber UT on the tire equatorial plane side of the outermost main groove is larger than the gauge Ga_ce and smaller than or equal to the gauge Ga_sh and the ratio H/GD of the gauge H to the groove depth GD of the outermost main groove is from 0.3 to 0.7.

Furthermore, referring to Examples 1 to 28, it can be seen that a good result is obtained in examples in which the undertread rubber UT includes the undertread center rubber UTce of the center land portion and the undertread shoulder rubber UTsh disposed on the outer side of the undertread center rubber UTce in the tire width direction and the hardness of the undertread shoulder rubber is higher than the hardness of the undertread center rubber, in examples in which, in a meridian cross-section, the gauge of the undertread shoulder rubber UTsh gradually decreases from the outermost main groove toward the tire equatorial plane, in examples in which, in a meridian cross-section, the boundary surface between the undertread center rubber UTce and the undertread shoulder rubber UTsh is inclined with respect to the tire width direction, and in examples in which the ratio D1/D2 of the distance D1 in the tire width direction from the outer end of the undertread rubber UT in the tire width direction to the outermost end portion of the reinforcing rubber layer in the tire radial direction to the distance D2 in the tire width direction from the outer edge of the outermost main groove to the outer end of the undertread rubber UT in the tire width direction is from 0.3 to 0.7.

Also, referring to Examples 1 to 28 in Tables 1 to 3, it can be seen that a good result is obtained in examples in which the gauge of the undertread rubber UT of the center land portion closest to the tire equatorial plane and the gauge of the undertread rubber UT of the shoulder land portion located on the outer side of the outermost main groove located furthest outward in the tire width direction are undifferentiated, the ratio Ga_ce/GD of the gauge Ga_ce of the undertread rubber UT in the center land portion to the groove depth GD of the outermost main groove is from 0.2 to 0.4, and the ratio Ga_sh/GD of the gauge Ga_sh of the undertread rubber UT in the shoulder land portion to the groove depth GD of the outermost main groove is from 0.4 to 0.7, and in examples in which the gauge H of the undertread rubber UT on the tire equatorial plane side of the outermost main groove is larger than the gauge Ga_ce and smaller than or equal to the gauge Ga_sh and the ratio H/GD of the gauge H to the groove depth GD of the outermost main groove is from 0.3 to 0.7.

TABLE 1-1

|  | Conventional Example | Comparative Example | Example 1 |
|---|---|---|---|
| UT gauge of center | UT gauge undifferentiated | Thick | Thin |
| UT gauge of shoulder |  | Thin | Thick |
| UT rubber gauge gradually decreases | No | No | Perpendicular to tread surface |
| Gradually decreasing range of width W1/wg | — | — | 1.0 |
| Ga_ce/GD | — | 0.6 | 0.4 |
| Ga_sh/GD | — | 0.4 | 0.6 |
| Relationship between H, Ga_ce, Ga_sh | — | Ga_ce > H > Ga_sh | Ga_ce < H ≤ Ga_sh |
| H/GD | — | 0.4 | 0.5 |
| Two types of UT rubber | No | No | No |
| Relationship between rubber hardnesses | — | — | — |
| UTsh rubber gauge gradually decreases | — | — | — |
| D1/D2 | 0.3 | 0.3 | 0.3 |
| Driving performance on ice in a normal internal pressure state (index value) | 100 | 98 | 101 |
| Driving performance on ice in a low pressure state (index value) | 100 | 98 | 102 |

TABLE 1-2

|  | Example 2 | Example 3 | Example 4 | Example 5 |
|---|---|---|---|---|
| UT gauge of center | Thin | Thin | Thin | Thin |
| UT gauge of shoulder | Thick | Thick | Thick | Thick |
| UT rubber gauge gradually decreases | Diagonal (straight line) | Diagonal (curved line protruding to inner side in radial direction) | Diagonal (curved line protruding to outer side in radial direction) | Diagonal (curved line protruding to outer side in radial direction) |
| Gradually decreasing range of width W1/wg | 1.0 | 1.0 | 0.5 | 4.0 |
| Ga_ce/GD | 0.4 | 0.4 | 0.4 | 0.4 |
| Ga_sh/GD | 0.6 | 0.6 | 0.6 | 0.6 |
| Relationship between H, Ga_ce, Ga_sh | Ga_ce < H ≤ Ga_sh | Ga_ce < H ≤ Ga_sh | Ga_ce < H ≤ Ga_sh | Ga_ce < H ≤ Ga_sh |
| H/GD | 0.5 | 0.5 | 0.5 | 0.5 |
| Two types of UT rubber | No | No | No | No |
| Relationship between rubber hardnesses | — | — | — | — |
| UTsh rubber gauge gradually decreases | — | — | — | — |
| D1/D2 | 0.3 | 0.3 | 0.3 | 0.3 |
| Driving performance on ice in a normal internal pressure state (index value) | 103 | 104 | 102 | 101 |
| Driving performance on ice in a low pressure state (index value) | 103 | 102 | 101 | 107 |

TABLE 1-3

|  | Example 6 | Example 7 | Example 8 |
|---|---|---|---|
| UT gauge of center | Thin | Thin | Thin |
| UT gauge of shoulder | Thick | Thick | Thick |
| UT rubber gauge gradually decreases | Diagonal (curved line protruding to outer side in radial direction) | Diagonal (curved line protruding to outer side in radial direction) | Diagonal (curved line protruding to outer side in radial direction) |
| Gradually decreasing range of width W1/wg | 3.0 | 2.0 | 1.0 |
| Ga_ce/GD | 0.4 | 0.4 | 0.4 |
| Ga_sh/GD | 0.6 | 0.6 | 0.6 |

TABLE 1-3-continued

|  | Example 6 | Example 7 | Example 8 |
|---|---|---|---|
| Relationship between H, Ga_ce, Ga_sh | Ga_ce < H ≤ Ga_sh | Ga_ce < H ≤ Ga_sh | Ga_ce < H ≤ Ga_sh |
| H/GD | 0.5 | 0.5 | 0.5 |
| Two types of UT rubber | No | No | No |
| Relationship between rubber hardnesses | — | — | — |
| UTsh rubber gauge gradually decreases | — | — | — |
| D1/D2 | 0.3 | 0.3 | 0.3 |
| Driving performance on ice in a normal internal pressure state (index value) | 102 | 103 | 103 |
| Driving performance on ice in a low pressure state (index value) | 106 | 105 | 104 |

TABLE 2-1

|  | Example 9 | Example 10 | Example 11 | Example 12 |
|---|---|---|---|---|
| UT gauge of center | Thin | Thin | Thin | Thin |
| UT gauge of shoulder | Thick | Thick | Thick | Thick |
| UT rubber gauge gradually decreases | Diagonal (curved line protruding to outer side in radial direction) | Diagonal (curved line protruding to outer side in radial direction) | Diagonal (curved line protruding to outer side in radial direction) | Diagonal (curved line protruding to outer side in radial direction) |
| Gradually decreasing range of width W1/wg | 1.0 | 1.0 | 1.0 | 1.0 |
| Ga_ce/GD | 0.8 | 0.1 | 0.2 | 0.4 |
| Ga_sh/GD | 0.4 | 0.3 | 0.4 | 0.5 |
| Relationship between H, Ga_ce, Ga_sh | Ga_ce < H ≤ Ga_sh | Ga_ce < H ≤ Ga_sh | Ga_ce < H ≤ Ga_sh | Ga_ce < H ≤ Ga_sh |
| H/GD | 0.5 | 0.5 | 0.5 | 0.5 |
| Two types of UT rubber | No | No | No | Yes |
| Relationship between rubber hardnesses | — | — | — | UTce > UTsh |
| UTsh rubber gauge gradually decreases | — | — | — | Perpendicular to tread surface |
| D1/D2 | 0.3 | 0.3 | 0.3 | 0.3 |
| Driving performance on ice in a normal internal pressure state (index value) | 102 | 101 | 102 | 101 |
| Driving performance on ice in a low pressure state (index value) | 106 | 102 | 103 | 102 |

TABLE 2-2

|  | Example 13 | Example 14 | Example 15 |
|---|---|---|---|
| UT gauge of center | Thin | Thin | Thin |
| UT gauge of shoulder | Thick | Thick | Thick |
| UT rubber gauge gradually decreases | Diagonal (curved line protruding to outer side in radial direction) | Diagonal (curved line protruding to outer side in radial direction) | Diagonal (curved line protruding to outer side in radial direction) |
| Gradually decreasing range of width W1/wg | 1.0 | 1.0 | 1.0 |
| Ga_ce/GD | 0.4 | 0.4 | 0.4 |
| Ga_sh/GD | 0.5 | 0.5 | 0.5 |
| Relationship between H, Ga_ce, Ga_sh | Ga_ce < H ≤ Ga_sh | Ga_ce < H ≤ Ga_sh | Ga_ce < H ≤ Ga_sh |
| H/GD | 0.5 | 0.5 | 0.5 |
| Two types of UT rubber | Yes | Yes | Yes |
| Relationship between rubber hardnesses | UTce > UTsh | UTce > UTsh | UTce > UTsh |

TABLE 2-2-continued

|  | Example 13 | Example 14 | Example 15 |
|---|---|---|---|
| UTsh rubber gauge gradually decreases | Diagonal (straight line) | Diagonal (curved line protruding to inner side in radial direction) | Diagonal (curved line protruding to outer side in radial direction) |
| D1/D2 | 0.3 | 0.3 | 0.3 |
| Driving performance on ice in a normal internal pressure state (index value) | 102 | 101 | 103 |
| Driving performance on ice in a low pressure state (index value) | 103 | 104 | 104 |

TABLE 2-3

|  | Example 16 | Example 17 | Example 18 |
|---|---|---|---|
| UT gauge of center | Thin | Thin | Thin |
| UT gauge of shoulder | Thick | Thick | Thick |
| UT rubber gauge gradually decreases | Diagonal (curved line protruding to outer side in radial direction) | Diagonal (curved line protruding to outer side in radial direction) | Diagonal (curved line protruding to outer side in radial direction) |
| Gradually decreasing range of width W1/wg | 1.0 | 1.0 | 2.0 |
| Ga_ce/GD | 0.4 | 0.4 | 0.4 |
| Ga_sh/GD | 0.6 | 0.6 | 0.6 |
| Relationship between H, Ga_ce, Ga_sh | Ga_ce < H ≤ Ga_sh | Ga_ce < Ga_sh < H | Ga_ce < H ≤ Ga_sh |
| H/GD | 0.5 | 0.5 | 0.3 |
| Two types of UT rubber | Yes | No | No |
| Relationship between rubber hardnesses | UTce < UTsh | — | — |
| UTsh rubber gauge gradually decreases | Diagonal (curved line protruding to outer side in radial direction) | Diagonal (curved line protruding to outer side in radial direction) | Diagonal (curved line protruding to outer side in radial direction) |
| D1/D2 | 0.3 | 0.3 | 0.3 |
| Driving performance on ice in a normal internal pressure state (index value) | 105 | 104 | 106 |
| Driving performance on ice in a low pressure state (index value) | 106 | 105 | 105 |

TABLE 3-1

|  | Example 19 | Example 20 | Example 21 | Example 22 |
|---|---|---|---|---|
| UT gauge of center | Thin | Thin | Thin | Thin |
| UT gauge of shoulder | Thick | Thick | Thick | Thick |
| UT rubber gauge gradually decreases | Diagonal (curved line protruding to outer side in radial direction) | Diagonal (curved line protruding to outer side in radial direction) | Diagonal (curved line protruding to outer side in radial direction) | Diagonal (curved line protruding to outer side in radial direction) |
| Gradually decreasing range of width W1/wg | 2.0 | 2.0 | 2.0 | 2.0 |
| Ga_ce/GD | 0.4 | 0.4 | 0.4 | 0.4 |
| Ga_sh/GD | 0.7 | 0.7 | 0.7 | 0.7 |
| Relationship between H, Ga_ce, Ga_sh | Ga_ce < H ≤ Ga_sh | Ga_ce < H ≤ Ga_sh | Ga_ce < H ≤ Ga_sh | Ga_ce < H ≤ Ga_sh |
| H/GD | 0.6 | 0.7 | 0.6 | 0.6 |
| Two types of UT rubber | No | No | Yes | Yes |
| Relationship between rubber hardnesses | — | — | UTce < UTsh | UTce < UTsh |

TABLE 3-1-continued

|  | Example 19 | Example 20 | Example 21 | Example 22 |
|---|---|---|---|---|
| UTsh rubber gauge gradually decreases | Diagonal (curved line protruding to outer side in radial direction) | Diagonal (curved line protruding to outer side in radial direction) | Diagonal (curved line protruding to outer side in radial direction) | Diagonal (curved line protruding to outer side in radial direction) |
| D1/D2 | 0.3 | 0.3 | 0.3 | 0.7 |
| Driving performance on ice in a normal internal pressure state (index value) | 106 | 105 | 106 | 109 |
| Driving performance on ice in a low pressure state (index value) | 106 | 107 | 108 | 106 |

TABLE 3-2

|  | Example 23 | Example 24 | Example 25 |
|---|---|---|---|
| UT gauge of center | Thin | Thin | Thin |
| UT gauge of shoulder | Thick | Thick | Thick |
| UT rubber gauge gradually decreases | Diagonal (curved line protruding to outer side in radial direction) | Diagonal (curved line protruding to outer side in radial direction) | Diagonal (curved line protruding to outer side in radial direction) |
| Gradually decreasing range of width W1/wg | 2.0 | 2.0 | 2.0 |
| Ga_ce/GD | 0.4 | 0.4 | 0.4 |
| Ga_sh/GD | 0.7 | 0.7 | 0.7 |
| Relationship between H, Ga_ce, Ga_sh | Ga_ce < H ≤ Ga_sh | Ga_ce < H ≤ Ga_sh | Ga_ce < H ≤ Ga_sh |
| H/GD | 0.6 | 0.6 | 0.6 |
| Two types of UT rubber | No | No | Yes |
| Relationship between rubber hardnesses | — | — | UTce < UTsh |
| UTsh rubber gauge gradually decreases | Diagonal (curved line protruding to outer side in radial direction) | Diagonal (curved line protruding to outer side in radial direction) | Diagonal (curved line protruding to outer side in radial direction) |
| D1/D2 | 0.5 | 0.7 | 0.5 |
| Driving performance on ice in a normal internal pressure state (index value) | 108 | 109 | 109 |
| Driving performance on ice in a low pressure state (index value) | 106 | 105 | 107 |

TABLE 3-3

|  | Example 26 | Example 27 | Example 28 |
|---|---|---|---|
| UT gauge of center | UT gauge undifferentiated | UT gauge undifferentiated | UT gauge undifferentiated |
| UT gauge of shoulder |  |  |  |
| UT rubber gauge gradually decreases | No | No | No |
| Gradually decreasing range of width W1/wg | — | — | — |
| Ga_ce/GD | 0.2 | 0.4 | 0.4 |
| Ga_sh/GD | 0.4 | 0.7 | 0.7 |
| Relationship between H, Ga_ce, Ga_sh | Ga_ce < H ≤ Ga_sh | Ga_ce < H ≤ Ga_sh | Ga_ce < H ≤ Ga_sh |
| H/GD | 0.6 | 0.6 | 0.6 |
| Two types of UT rubber | Yes | Yes | Yes |
| Relationship between rubber hardnesses | UTce < UTsh | UTce < UTsh | UTce < UTsh |
| UTsh rubber gauge gradually decreases | Diagonal (straight line) | Diagonal (curved line protruding to inner side in radial direction) | Diagonal (curved line protruding to outer side in radial direction) |

TABLE 3-3-continued

|  | Example 26 | Example 27 | Example 28 |
|---|---|---|---|
| D1/D2 | 0.3 | 0.3 | 0.7 |
| Driving performance on ice in a normal internal pressure state (index value) | 103 | 103 | 102 |
| Driving performance on ice in a low pressure state (index value) | 103 | 104 | 105 |

The invention claimed is:

1. A run-flat tire, comprising:

a reinforcing rubber layer having a roughly crescent-shaped meridian cross-section and being disposed in sidewall portions at both sides in a tire width direction, a tread portion being provided formed of a tread rubber that comprises a cap tread rubber and an undertread rubber, the undertread rubber being disposed on an inner side of the cap tread rubber in a tire radial direction and having a higher hardness than the cap tread rubber, and in a meridian cross-section, a gauge of the undertread rubber on a shoulder land portion on an outer side of an outermost main groove located furthest outward in the tire width direction being thicker than a gauge of the undertread rubber of a center land portion closest to a tire equatorial plane, wherein a cross-sectional profile of the cap tread rubber is symmetrical across the tire equatorial plane and a cross-sectional profile of the undertread rubber is symmetrical across the tire equatorial plane, a ratio Ga_ce/GD of a gauge Ga_ce of the undertread rubber at the center land portion to a groove depth GD of the outermost main groove is from 0.2 to 0.4, a ratio Ga_sh/GD of a gauge Ga_sh of the undertread rubber at the shoulder land portion to the groove depth GD of the outermost main groove is from 0.4 to 0.6, the gauge Ga_ce of the undertread rubber at the center land portion and the gauge Ga_sh of the undertread rubber at the shoulder land portion have a relationship Ga_ce<Ga_sh, the gauge of the undertread rubber gradually decreases from the outermost main groove toward the tire equatorial plane, a ratio W1/Wg of a width W1 in the tire width direction of a portion of the undertread rubber where the gauge of the undertread rubber gradually decreases from the outermost main groove toward the tire equatorial plane to a groove width Wg of the outermost main groove is from 1.0 to 3.0, and the gauges of the undertread rubber Ga_ce and Ga_sh are determined by measuring groove bottoms of the outermost main groove and other main grooves using an imaginary line as a reference, and finding an average gauge within the land portion or a block, excluding the portion of the outermost main groove and the other main grooves.

2. The run-flat tire according to claim 1, wherein a gauge H of the undertread rubber on the tire equatorial plane side of the outermost main groove is larger than the gauge Ga_ce of the undertread rubber at the center land portion and smaller than or equal to the gauge Ga_sh of the undertread rubber at the shoulder land portion, and a ratio H/GD of the gauge H to the groove depth GD of the outermost main groove is from 0.3 to 0.6.

3. The run-flat tire according to claim 1, wherein the undertread rubber comprises an undertread center rubber of the center land portion, and an undertread shoulder rubber disposed on an outer side of the undertread center rubber in the tire width direction, and a hardness of the undertread shoulder rubber is higher than a hardness of the undertread center rubber.

4. The run-flat tire according to claim 3, wherein in the meridian cross-section, a gauge of the undertread shoulder rubber gradually decreases from the outermost main groove toward the tire equatorial plane.

5. The run-flat tire according to claim 3, wherein in the meridian cross-section, a boundary surface between the undertread center rubber and the undertread shoulder rubber is inclined with respect to the tire width direction, and a whole of the boundary surface is disposed on the inner side of the outermost main groove in the tire width direction.

6. The run-flat tire according to claim 1, wherein a ratio D1/D2 of a distance D1 in the tire width direction from an outer end of the undertread rubber in the tire width direction to an outermost end portion of the reinforcing rubber layer in the tire radial direction to a distance D2 in the tire width direction from an outer edge of the outermost main groove to an outer end of the undertread rubber in the tire width direction is from 0.3 to 0.7.

7. The run-flat tire according to claim 2, wherein the undertread rubber comprises an undertread center rubber of the center land portion, and an undertread shoulder rubber disposed on an outer side of the undertread center rubber in the tire width direction, and a hardness of the undertread shoulder rubber is higher than a hardness of the undertread center rubber.

8. The run-flat tire according to claim 7, wherein in a meridian cross-section, a gauge of the undertread shoulder rubber gradually decreases from the outermost main groove toward the tire equatorial plane.

9. The run-flat tire according to claim 8, wherein in a meridian cross-section, a boundary surface between the undertread center rubber and the undertread shoulder rubber is inclined with respect to the tire width direction, and a whole of the boundary surface is disposed on the inner side of the outermost main groove in the tire width direction.

10. The run-flat tire according to claim 9, wherein a ratio D1/D2 of a distance D1 in the tire width direction from an outer end of the undertread rubber in the tire width direction to an outermost end portion of the reinforcing rubber layer in the tire radial direction to a distance D2 in the tire width direction from an outer edge of the outermost main groove to an outer end of the undertread rubber in the tire width direction is from 0.3 to 0.7.

11. A run-flat tire, comprising:
a reinforcing rubber layer having a roughly crescent-shaped meridian cross-section and being disposed in sidewall portions at both sides in a tire width direction,
a tread portion being provided formed of a tread rubber that comprises a cap tread rubber and an undertread rubber, the undertread rubber being disposed on an inner side of the cap tread rubber in a tire radial direction and having a higher hardness than the cap tread rubber,
the undertread rubber comprising an undertread center rubber of a center land portion, and an undertread shoulder rubber disposed on an outer side of the undertread center rubber in the tire width direction,
a hardness of the undertread shoulder rubber being higher than a hardness of the undertread center rubber,
a gauge of the undertread shoulder rubber gradually decreasing from an outermost main groove located furthest outward in the tire width direction toward a tire equatorial plane, and
a gauge of the undertread center rubber gradually increasing from the outermost main groove toward the tire equatorial plane; wherein
a cross-sectional profile of the cap tread rubber is symmetrical across the tire equatorial plane and a cross-sectional profile of the undertread rubber is symmetrical across the tire equatorial plane,
a whole of a boundary surface between the undertread center rubber and the undertread shoulder rubber is disposed on the inner side of the outermost main groove in the tire width direction,
a ratio Ga_ce/GD of a gauge Ga_ce of the undertread rubber at the center land portion to a groove depth GD of the outermost main groove is from 0.2 to 0.4,
a ratio Ga_sh/GD of a gauge Ga_sh of the undertread rubber at the shoulder land portion to the groove depth GD of the outermost main groove is from 0.4 to 0.6,
the gauge Ca_ce of the undertread rubber at the center land portion and the gauge Ga_sh of the undertread rubber at the shoulder land portion have a relationship Ga_ce<Ga_sh,
the gauge of the undertread rubber gradually decreases from the outermost main groove toward the equatorial plane,
a ratio W1/Wg of a width W1 in the fire width direction of a portion of the undertread rubber where the gauge of the undertread rubber gradually decreases from the outermost main groove toward the tire equatorial plane to a groove width Wg of the outermost main groove is from 1.0 to 3.0, and
the gauges of the undertread rubber Ga_ce and Ga_sh are determined by measuring groove bottoms of the outermost main groove and other main grooves using an imaginary line as a reference, and finding the average gauge within the land portion or a block, excluding the portion of the outermost main groove and the other main grooves.

12. A run-flat tire, comprising:
a reinforcing rubber layer having a roughly crescent-shaped meridian cross-section and being disposed in sidewall portions at both sides in a tire width direction,
a tread portion being provided formed of a tread rubber that comprises a cap tread rubber and an undertread rubber, the undertread rubber being disposed on an inner side of the cap tread rubber in a tire radial direction and having a higher hardness than the cap tread rubber, and
in a meridian cross-section, a gauge of the undertread rubber on a shoulder land portion on an outer side of an outermost main groove located furthest outward in the tire width direction being thicker than a gauge of the undertread rubber of a center land portion closest to a tire equatorial plane, wherein
a cross-sectional profile of the cap tread rubber is symmetrical across the tire equatorial plane and a cross-sectional profile of the undertread rubber is symmetrical across the tire equatorial plane,
a gauge H of the undertread rubber on a tire equatorial plane side of the outermost main groove is larger than a gauge Ga_ce of the undertread rubber at the center land portion and smaller than or equal to the gauge Ga_sh of the undertread rubber at the shoulder land portion,
a ratio H/GD of the gauge H to a groove depth GD of the outermost main groove is from 0.3 to 0.5,
the gauge Ga_ce of the undertread rubber at the center land portion and the gauge Ga_sh of the undertread rubber at the shoulder land portion have a relationship Ga_ce<Ga_sh,
the gauge of the undertread rubber gradually decreases from the outermost main groove toward the tire equatorial plane,
a ratio W1/Wg of a width W1 in the tire width direction of a portion of the undertread rubber where the gauge of the undertread rubber gradually decreases from the outermost main groove toward the tire equatorial plane to a groove width Wg of the outermost main groove is from 1.0 to 3.0, and
the gauge H of the undertread rubber is determined by measuring groove bottoms of the outermost main groove and other main grooves using an imaginary line as a reference, and finding the average gauge within the land portion or a block, excluding the portion of the outermost main groove and the other main grooves.

* * * * *